United States Patent
Araújo et al.

(10) Patent No.: US 12,056,893 B2
(45) Date of Patent: Aug. 6, 2024

(54) MONOCULAR CAMERA ACTIVATION FOR LOCALIZATION BASED ON DATA FROM DEPTH SENSOR

(71) Applicant: Telefonaktiebolaget LM Ericsson (publ), Stockholm (SE)

(72) Inventors: José Araújo, Stockholm (SE); AmirHossein Taher Kouhestani, Solna (SE); Diego Gonzalez Morin, Galapagar (ES); Ioannis Karagiannis, Kalamata (GR); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 17/795,322

(22) PCT Filed: Feb. 7, 2020

(86) PCT No.: PCT/EP2020/053072
§ 371 (c)(1),
(2) Date: Jul. 26, 2022

(87) PCT Pub. No.: WO2021/155946
PCT Pub. Date: Aug. 12, 2021

(65) Prior Publication Data
US 2023/0089616 A1    Mar. 23, 2023

(51) Int. Cl.
*G06T 7/73* (2017.01)
*G01S 17/894* (2020.01)
(Continued)

(52) U.S. Cl.
CPC ............. *G06T 7/73* (2017.01); *G01S 17/894* (2020.01); *G06T 7/50* (2017.01); *H04N 23/66* (2023.01);
(Continued)

(58) Field of Classification Search
CPC . G06F 1/3287; G06T 7/73; G06T 7/50; G06T 2207/10028; G06T 2207/30241;
(Continued)

(56) References Cited

U.S. PATENT DOCUMENTS

2014/0139639 A1* 5/2014 Wagner ................ H04N 13/204
348/46
2016/0088206 A1* 3/2016 Robinson ............... G01B 11/22
348/135

(Continued)

FOREIGN PATENT DOCUMENTS

WO        2015077778 A1    5/2015

OTHER PUBLICATIONS

International Search Report and Written Opinion of the International Searching Authority for PCT International Application No. PCT/EP2020/053072 dated Oct. 22, 2020.
(Continued)

*Primary Examiner* — John R Schnurr
(74) *Attorney, Agent, or Firm* — Sage Patent Group (57) ABSTRACT

A device is disclosed that is configured for performing localization using one or both of a depth sensor and a monocular camera that are transportable with the device. The device is adapted to receive depth data from the depth sensor, determine a benefit level of activating the monocular camera for localization, based on the depth data, and activate the monocular camera for localization based on a determination that the benefit level of activating the monocular camera satisfies an activation rule. Related methods and computer program products are also disclosed.

19 Claims, 7 Drawing Sheets

(51) Int. Cl.
*G06T 7/50* (2017.01)
*H04N 23/66* (2023.01)

(52) U.S. Cl.
CPC .............. *G06T 2207/10028* (2013.01); *G06T 2207/30241* (2013.01); *G06T 2207/30244* (2013.01)

(58) Field of Classification Search
CPC ........ G06T 2207/30244; G01S 17/894; H04N 23/66
See application file for complete search history.

(56) References Cited

U.S. PATENT DOCUMENTS

| | | | |
|---|---|---|---|
| 2017/0221225 A1* | 8/2017 | Peri | G06F 18/22 |
| 2017/0336439 A1* | 11/2017 | Li | G01S 5/0294 |
| 2019/0355169 A1* | 11/2019 | Sapienza | G06V 20/70 |
| 2019/0356849 A1 | 11/2019 | Sapienza et al. | |
| 2020/0033127 A1* | 1/2020 | Tsujii | G06F 1/3212 |
| 2020/0133300 A1* | 4/2020 | Iyer | G02B 27/017 |
| 2021/0157390 A1* | 5/2021 | Yardi | G06F 3/017 |
| 2022/0060622 A1* | 2/2022 | Brandli | G06F 3/0346 |
| 2023/0033951 A1* | 2/2023 | Karagiannis | G06F 1/1626 |
| 2023/0342972 A1* | 10/2023 | Araújo | H04N 5/2226 |

OTHER PUBLICATIONS

Zhang et al., "Good Features to Track for Visual SLAM," 2015 IEEE Conference on Computer Vision and Pattern Recognition (CVPR), 2015, pp. 1373-1382.
Schneider et al., "Maplab: An Open Framework for Research in Visual-Inertial Mapping and Localization," IEEE Robotics and Automation Letters, vol. 3, No. 3, Jul. 2018, pp. 1418-1425.

* cited by examiner

```
┌─────────────────────────────────────────────────────────────┐
│  Deactivate the depth sensor based on a determination that the │ ─── 800
│  benefit level of using the depth sensor for localization satisfies a │
│                    deactivation rule                          │
└─────────────────────────────────────────────────────────────┘
```

Figure 8

```
┌─────────────────────────────────────────────────────────────┐
│   Repeat the conversion of the depth data representing the    │ ─── 900
│    perspective in the 3D localization map to the 2D depth data │
│  representing the 2D depth image for each of a plurality of different │
│              perspectives in the 3D localization map          │
└─────────────────────────────────────────────────────────────┘
```

Figure 9

```
┌─────────────────────────────────────────────────────────────┐
│ Repeat the conversion of the historical depth data representing the │
│ perspective in the historical 3D localization map to the historical 2D │ ─── 1000
│ depth data representing the historical 2D depth image for each of a │
│    plurality of different perspectives along a motion trajectory of the │
│    monocular camera relative to the historical 3D localization map │
└─────────────────────────────────────────────────────────────┘
```

Figure 10

```
┌─────────────────────────────────────────────────────────────┐
│  Determine the threshold value based on a determination of number │
│  of keypoint features in the depth data from the depth sensor that are │ ─── 1100
│         estimated to be detectable by the monocular camera, and │
│         determination that the number of keypoint features satisfies a │
│  threshold number of keypoint features needed to perform localization │
└─────────────────────────────────────────────────────────────┘
```

Figure 11

MONOCULAR CAMERA ACTIVATION FOR LOCALIZATION BASED ON DATA FROM DEPTH SENSOR

CROSS REFERENCE TO RELATED APPLICATION

This application is a 35 U.S.C. § 371 national stage application of PCT International Application No. PCT/EP2020/053072 filed on Feb. 7, 2020, the disclosure and content of which is incorporated by reference herein in its entirety.

TECHNICAL FIELD

The present disclosure relates to a device for performing localization using one or both of a depth sensor and a monocular camera that are transportable with the device, a method by a device for performing localization using one or both of a depth sensor and a monocular camera that are transportable with the device, and a corresponding computer program product.

BACKGROUND

Localization and mapping algorithms, such as Simultaneous localization and mapping (SLAM) algorithms, are a technology that allows devices to localize themselves in an environment while relying on onboard sensors such as cameras, range sensors, inertial sensors among others. This is essential for robots to navigate and understand an environment to perform a task, as well as for enabling realistic and persistent content to be displayed in mixed reality devices.

For example, current Mixed Reality (MR) headsets and state-of-the-art smartphones contain RGB cameras, depth/3D cameras (e.g. passive or active stereo, LIDAR, etc.) and inertial sensors (IMU) and the same is true for indoor and outdoor robots, such as drones and autonomous vehicles. For example, Intel and Microvision have recently launched small "consumer" oriented LIDAR products. However, other depth sensors or 3D sensors are very commonplace in headsets and other devices such as robots.

Several SLAM algorithms have been proposed which rely on RGB and IMU sensors, depth sensors or a combination of all of these. A reason for using a combination of different types of sensors is to leverage unique operational advantages of the differing sensors, and to improve on their individual limitations. For example, an RGB camera performs poorly in a dark or too bright environment since visual features are hard or impossible to acquire in such environments, where a depth camera such as a LIDAR or active stereo camera would perform well in such scenarios. Moreover, by directly measuring depth the localization and mapping may be performed with higher accuracy and may capture a larger amount of information of the environment (e.g. construction of a dense map instead of a sparse map), among other benefits.

However, depth cameras usually have a larger energy consumption and processing requirements and may perform poorly in certain conditions. For example, depth cameras have a limited measurement range, and may perform badly in low textured environments (passive stereo cameras) and in areas with directly sunlight or IR interference (active stereo cameras and LIDAR), under rain conditions (LIDAR), among other limitations. Hence, it is desirable to schedule the usage of all the available sensors to achieve accurate and robust localization and mapping while also reducing the energy resources of the device.

Localization and mapping algorithms, such as SLAM algorithms, can be used with a mobile device traveling with a plurality of sensors to simultaneously build a consistent geometric map and determine location of the mobile device within the map. Some localization and mapping algorithms utilize data from cameras and sometimes other types of sensors to increase robustness but can still fail to produce consistent maps in some environments. In visually degraded environments, e.g. dark room or tunnel, it is harder to extract useful information from a camera due to features being determined or recognized with a lower probability or not at all.

SUMMARY

Currently available devices which use sensors for localization, such as Microsoft Hololens, Magic Leap, ARCore and ARKit, assume that all such sensors are always active, e.g., powered-on, and have no awareness of the need for and ability to perform selective activation and deactivation of individual sensors.

Some embodiments of the present disclosure are directed to a device that is configured to perform localization using one or both of a depth sensor and a monocular camera that are transportable with the device. The device includes at least one processor operationally connected to the depth sensor and the monocular camera. The device also includes at least one memory storing program code that is executed by the at least one processor to perform operations to receive depth data from the depth sensor. The operations determine a benefit level of activating the monocular camera for localization, based on the depth data, and activate the monocular camera for localization based on a determination that the benefit level of activating the monocular camera satisfies an activation rule.

Some other related embodiments are directed to a method by a device for performing localization using one or both of a depth sensor and a monocular camera that are transportable with the device. The method includes receiving depth data from the depth sensor, and determining a benefit level of activating the monocular camera for localization based on the depth data. The method activates the monocular camera for localization based on a determination that the benefit level of activating the monocular camera satisfies an activation rule.

Some other related embodiments are directed to a computer program product for performing localization using one or both of a depth sensor and a monocular camera that are transportable with a device. The computer program product includes a non-transitory computer readable medium storing instructions executable at least one processor of the device to configure the device to receive depth data from the depth sensor, determine a benefit level of activating the monocular camera for localization, based on the depth data, and activate the monocular camera for localization based on a determination that the benefit level of activating the monocular camera satisfies an activation rule.

Potential advantages of one or more of these embodiments may include that the device is able to determine using depth data from a depth sensor when a monocular camera can provide a sufficient benefit level such that it should be activated from a deactivated state for subsequent use in localization. In this manner, the monocular camera does not have to already be activate in order to programmatically determine whether it would provide a sufficient benefit level for use in localization to justify its activation and use. These operations can reduce the energy consumption and computational resource utilization of the device when performing localization.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Methods, devices, and computer program products are disclosed that determine when a monocular camera that is currently deactivated should be activated for use in performing localization operations based on depth data that is received from a depth sensor. As will be explained below, a benefit level of activating a monocular camera for localization is determined based on depth data from a depth sensor, such as based on structural information for physical objects identified in the depth data. The monocular camera is activated for localization based on a determination that the benefit level of activating the monocular camera satisfies an activation rule. Although various embodiments are described in the context of performing localization, these and other embodiments can be used to perform combined localization and mapping operations, such as SLAM. Accordingly, the term "localization" is used herein to interchangeably refer to operations that are only configured to perform localization functionality and to operations that are configured to perform a combination of localization and mapping functionality, such as SLAM.

Figure 1:
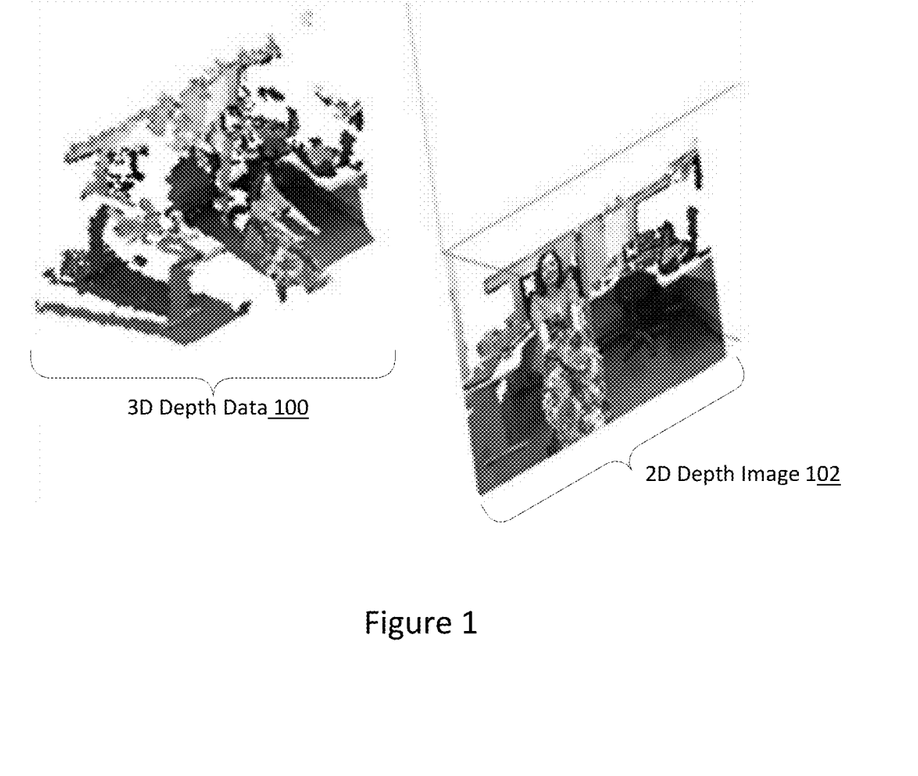
FIG. 1 illustrates a conversion from three-dimensional (3D) depth data from a depth sensor to a two-dimensional (2D) depth image for use in which is processed to determine the benefit level that can be obtained by activating a monocular camera for use in localization, in accordance with some embodiments.

Various embodiments of the present disclosure are described in the context of a device that includes both a monocular camera and a depth sensor. FIG. 1 illustrates operations that convert three-dimensional (3D) depth data 100 from a depth sensor, such as LIDAR, to a two-dimensional (2D) depth image 102. The 2D depth image 102 can then be processed to determine the benefit level that can be obtained by activating a monocular camera for use in localization, in accordance with some embodiments. An estimate of the image that can be captured by the monocular camera, such as an RGB camera, can be extracted from the 3D depth data 100 by converting the 3D depth data 100 into the 2D depth image 102 using intrinsic parameters of the depth camera. The intrinsic parameters can be obtained or determined using, for example, a Software Development Kit (SDK) for the depth sensor (see for example the Intel Real Sense D400 camera series SDK). Although various embodiments are described herein in the context of using 3D depth data, it is to be understood that any dimensional (e.g., 1D, 2D, 3D) depth data can be used. Accordingly, the term "3D depth data" refers to depth data from a sensor which provides a three-dimensional indication of sensed depth to environmental objects. In contrast, the term "depth data" refers to depth data from a sensor which provides any dimensional indication of sensed depth to environmental objects.

Potential advantages of one or more of these embodiments may include that the device is able to determine based on the 3D depth data 100 received from the depth sensor when a monocular camera can provide a sufficient benefit level that it should be activated from a deactivated state for use in localization. In this manner, the monocular camera does not have to already be activated in order to programmatically determine whether it would provide a sufficient benefit level for use in localization. These operations can reduce the energy consumption and computational resource utilization of the device when performing localization.

In some embodiments, the following operations can be performed to determine whether the benefit level of activating the monocular camera is sufficient to trigger its activation, and which may further determine whether the depth sensor should be deactivated:

1. Receive depth data from the depth sensor;
2. Determine the benefit level of activating the monocular camera, based on the depth data;
3. Activate the monocular camera if the benefit level of activating the monocular camera for localization satisfies an activation rule; and
4. (Optionally) Determine a benefit level of using the depth sensor for localization, based on the depth data from the depth sensor and based on image data from the monocular camera after the activation of the monocular camera has been performed, and deactivate the depth sensor based on a determination that the benefit level of using the depth sensor for localization satisfies a deactivation rule.

Figure 5:
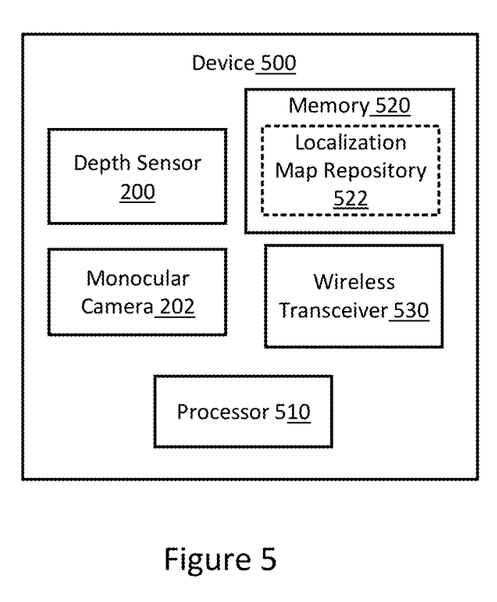
FIG. 5 illustrates a block diagram of components of a device that are configured in accordance with some embodiments of the present disclosure.
Figure 6:
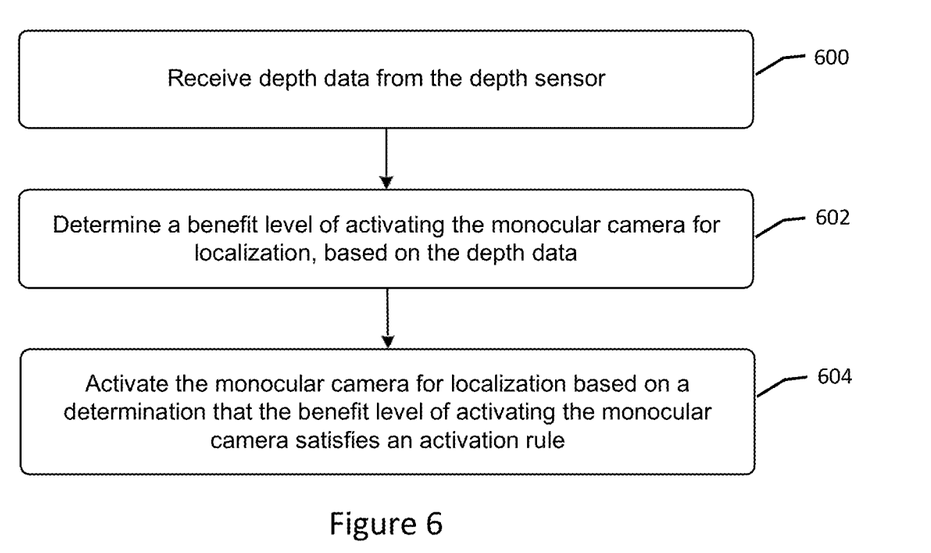
FIGS. 6 through 11 illustrate flowcharts of operations by a device for controlling activation of a monocular camera and deactivation of a depth sensor for localization in accordance with some embodiments of the present disclosure.

FIG. 5 illustrates a block diagram of components of an example device 500 that are configured in accordance with some embodiments of the present disclosure. FIG. 6 illustrate a flowchart of operations that may be performed by the device 500 to control activation of a monocular camera 202 for localization based on a determination that the benefit level of activating the monocular camera 202 for localization satisfies an activation rule, in accordance with some embodiments of the present disclosure.

Referring to FIGS. 5 and 6, in some embodiments, the device 500 includes at least one processor 510 (hereinafter "processor") operationally connected to a depth sensor 200, a monocular camera 202, and at least one memory 520 (hereinafter "memory") storing program code that is executed by the processor 510 to perform operations to receive 600 depth data from the depth sensor 200, determine 602 based on the depth data a benefit level of activating the monocular camera 202 for localization, and activate 604 the monocular camera 202 for localization based on a determination that the benefit level of activating the monocular camera 202 satisfies an activation rule. The memory 520 may include a localization map repository 522 (e.g., historical local map) which may be used as explained below. The device 500 may include a wireless transceiver 530 that is configured to communicate through a wireless interface.

The depth sensor 200 and the monocular camera 202 are transportable with the device 500 but are not necessarily part of the device 500. For example, although FIG. 5 illustrates that the device 500 includes the depth sensor 200, the monocular camera 202, the processor 510, and the memory 520, in some embodiments one or more of these components may be separate from the device 500 and communicatively connected thereto through the wireless transceiver 530 and/or a wired interface. The device 500 can be, but is not limited to, a component of any of a smartphone, wearable computer, augmented reality headset, virtual reality headset, mixed reality headset, semi-autonomous or autonomous vehicle, drone, aircraft, robot, etc.

Figure 3:
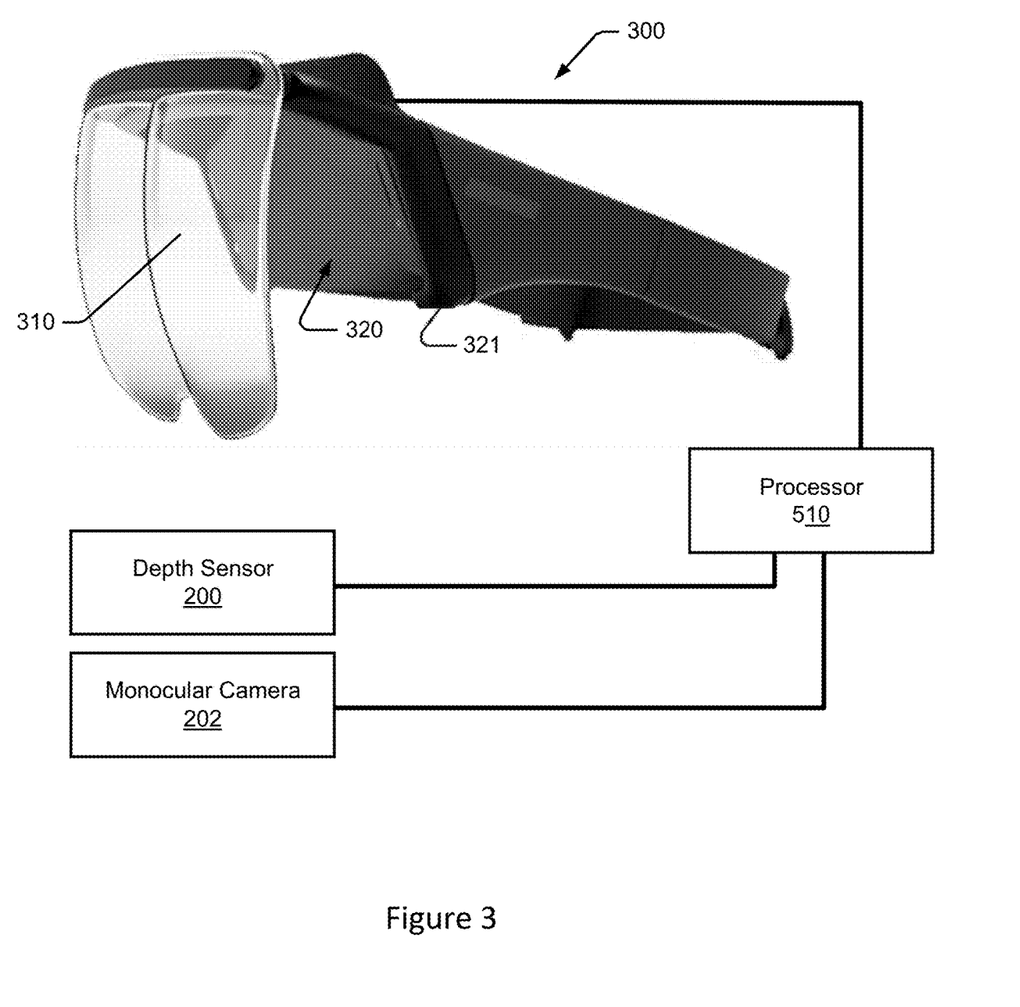
FIG. 3 illustrates a mixed reality, MR, system that includes a MR headset that holds a mobile electronic device which can include or is operationally connected to a set of sensors and configured to operate in accordance with some embodiments of the present disclosure.

FIG. 3 illustrates a mixed-reality (MR) system that includes a MR headset 300 that holds a mobile electronic device 320 which can be operationally connected, e.g., via wired and/or wireless communication interfaces, to at least one monocular camera 202 and at least one depth sensor 200. The mobile electronic device 320 can include or be operationally connected to a processor 510 and memory storing program code that configures the processor 510 to activate and deactivate individual one(s) of the monocular camera 202 and depth sensor 200 while using the active one(s) of the monocular camera 202 and depth sensor 200 to perform localization.

Although various embodiments are described in the context of activating and deactivating individual sensors, e.g., one monocular camera and one depth sensor, these embodiments may be used to activate and deactivate sets of sensors. Thus, for example, the "monocular camera" may correspond to a set of monocular cameras, the "depth sensor" may correspond to a set of depth sensors. A set of sensors may contain homogeneous or non-homogeneous types of sensors.

The MR headset 300 includes a lens 310 through which a user who is wearing the MR headset can view real-world features. The MR headset 300 further includes a holder 321 that is configured to releasably retain the mobile electronic device 320 in a defined orientation relative to the lens 310 so that images displayed on a display device of the mobile electronic device 320 are reflected by the lens 310 directly or indirectly toward the user's eyes. Although not shown, the MR headset 300 may include intervening mirrors that are positioned between the lens 310 and the user's eyes and, hence, the light may be reflected directly or indirectly toward the user's eyes and/or the camera 202.

The mobile electronic device 320 can include, but is not limited to, a smart phone, a palmtop computer, a tablet computer, gaming device, or other computing device. A "mobile electronic device" is also referred to herein as a "mobile device" and "device" for brevity.

Figure 2:
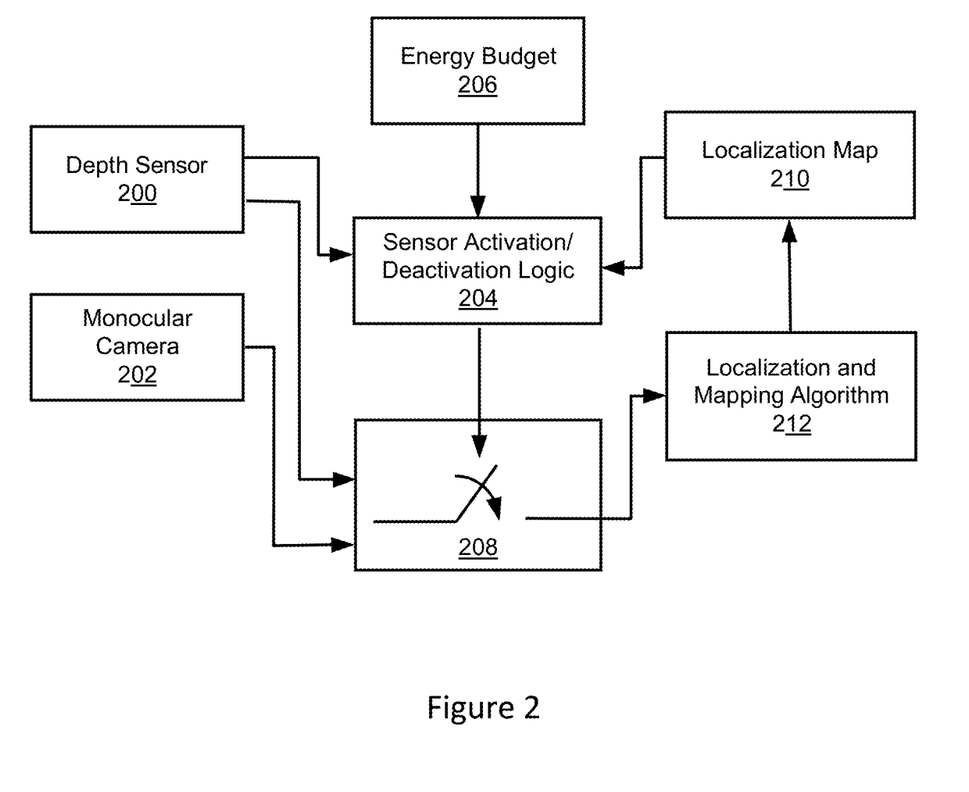
FIG. 2 illustrates a system diagram of a device for localization in accordance with some embodiments of the present disclosure.

FIG. 2 illustrates a system diagram of the device configured to perform localization operations and/or combined localization and mapping operations, e.g., SLAM, using the depth sensor 200 and the monocular sensor 202 in accordance with some embodiments of the present disclosure. Referring to FIG. 2, the device includes sensor activation and deactivation logic 204 which is configured to determine a benefit level of activating the monocular camera 202 for localization operations based on the depth data from the depth sensor 200, and to selectively activate the monocular camera 202 based on the determination. The sensor activation and deactivation logic 204 may also be configured to deactivate the depth sensor 200 based on a determination that the benefit level of using the depth sensor 200 for localization satisfies a deactivation rule, such as when the monocular camera 202 has become activated for localization and when continued use of the depth sensor 200 does not provide sufficient continued benefit. While the monocular camera 202 is active, image data is provided from the monocular camera 202 to a localization algorithm, such as a localization and mapping algorithm 212. Similarly while the depth sensor 200 is active, depth data is provided from the depth sensor 200 to the localization algorithm, such as the localization and mapping algorithm 212.

The sensor activation and deactivation logic 204 controls switch logic 208 that performs deactivation and activation of selected ones of the sensors 200 and 202. The switch logic 208 can perform activation of a sensor (i.e., the depth sensor 200 or the monocular camera 202) by triggering at least one of transitioning the sensor to a higher power state, powering-on the sensor, increasing a data sampling rate of the sensor to a level which is used for localization, increasing resolution of the sensor to a level which is used for localization, changing an optical parameter (e.g., focal length, field of view, etc.) to what is used for localization, and adapting the localization algorithm to use parameters (e.g., optical parameters) of the sensor. Conversely, the switch logic 208 can perform deactivation of the sensor by triggering at least one of transitioning the sensor to a lower power state, powering-off the sensor, decreasing a data sampling rate of the sensor to a level below what is used for localization, decreasing resolution of the sensor to a level which is below what is used for localization, changing an optical parameter (e.g., focal length, field of view, etc.) to what is not used for localization, and adapting the localization algorithm to cease using parameters (e.g., optical parameters) of the sensor. Accordingly, the term "switch" is not constrained to an off-on switch but alternatively or additionally can include control logic that performs one or more of the more complex above-activities for activating and deactivating sensors.

In one embodiment, the operations to adapt the localization algorithm to use optical parameters of a sensor for localization can include obtaining algorithm parameters corresponding to the optical parameters of the sensor. The algorithm parameters can be predetermined based on offline tuning of the localization algorithm for different sets of optical parameters. Then, based on a defined set of optical parameters for a sensor the corresponding predetermined algorithm parameters are selected for use.

As will be explained in further detail below, the sensor activation and deactivation logic 204 may operationally use information provided by an energy budget 206 and/or information provided by a localization map 210, which may reside in the localization map repository 522 in FIG. 5, to determine when to activate the monocular camera 202 and/or when to deactivate the depth sensor 200.

In order for the monocular camera 202 to provide image data that can be used for localization operations and/or combined localization and mapping operations, e.g., SLAM, the monocular camera 202 has to be able to capture relevant environmental features. Various alternative embodiments of operations will now be explained that can determine the benefit level of activating the monocular camera based on the performance of a localization algorithm, such as the localization and mapping algorithm 212.

Performance of a localization algorithm, such as the localization and mapping algorithm 212, using the monocular camera 202 is initially explained. The performance can be directly dependent on the detection of visual features by the monocular camera 202. If desired visual features cannot be detected in a robust manner, the localization algorithm, e.g., the localization and mapping algorithm 212, will operationally fail. Feature descriptors (e.g. SIFT, BRISK, ORB, machine learning-based) typically describe high-contrast regions of the image, such as edges, corners, etc. Not all measured features in localization and mapping algorithms, e.g., SLAM, contribute to accurate localization during the estimation process, thus operations herein may utilize only those that do. The ultimate goal is that the features can be detected in a robust manner which are able to provide geometric information regarding the motion of the monocular camera 202 based on a sequence of image data frames of a scene. Hence, the performance of the localization algorithm, e.g., localization and mapping algorithm 212, using the monocular camera 202 can be determined based on an assessment of the quantity and quality of detected features. Various embodiments disclosed herein are directed to determining a benefit level of activating the monocular camera 202 for localization, based on predicting the performance of the localization algorithm based on analysis of the depth data from the depth sensor 200. The monocular camera 202 is then selectively activated for localization and/or combined localization and mapping, e.g., SLAM, based on whether the determined benefit level satisfies an activation rule.

Various approaches are discussed below for determining if the monocular camera 202 would be able to capture enough relevant object features in the environment based on analyzing the 3D depth data 100 captured by the depth sensor 200. Various further related approaches are discussed below for determining the benefit level of the monocular camera 202.

In some embodiments, the benefit level of activating the monocular camera 202 is determined based on sampling and analyzing the 3D depth data 100 after conversion to a 2D depth image 102, as illustrated in FIG. 1. In one embodiment, the benefit level of activating the monocular camera 202 for localization is determined 602 based on converting the depth data, which represents a 3D localization map 210, to 2D depth data representing a 2D depth image 102, and generating an approximation of depth information that can be acquired from the monocular camera 202 if activated, based on the 2D depth image 102. The benefit level of activating the monocular camera 200 for localization is then determined based on the approximation of depth information.

In one particular example, the benefit level is determined based on converting the 3D depth data 100 into 2D depth image 102 using the depth camera intrinsics, where the depth sensor intrinsics may be provided by the manufacturer or can be obtained via calibration of the depth sensor 200. For example, given a depth sensor intrinsics matrix M, a 3D voxel with pose P_3D can be converted into a 2D pixel with pose P_2D as P_2D=M*P_3D. For example, for the Intel RealSense D400 depth cameras this procedure is implemented by the function rs2_project_point_to_pixel( ) which is part of the device's software, where given the 3D voxel as an input, this function computes the corresponding 2D pixel.

Referring to an example of this process shown in FIG. 1, the 2D depth image 102 is generated as an approximation of the information that would be required by the monocular camera 202 if activated. The approximation may be performed more accurately by repeating the conversion for a sequence of 3D depth data 100 into a sequence of 2D depth images 102 from different perspectives. This may correspond to taking snapshots of the 3D depth data 100, depicted as a 3D depth data, from different perspectives.

Figure 9:
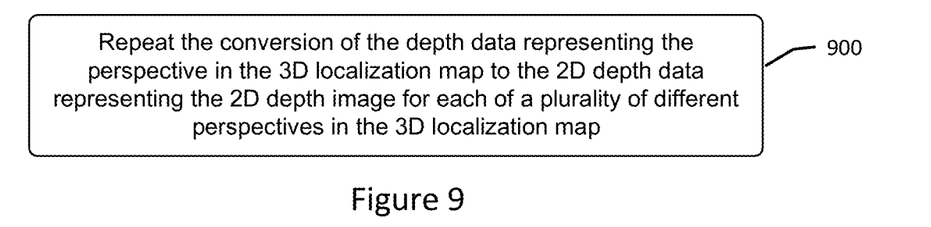

Corresponding operations are illustrated in FIG. 9, which are configured in accordance with some embodiments of the present disclosure. Referring to FIG. 9, for each of a plurality of different perspectives in the 3D localization map 210, operations repeat 900 the conversion of the depth data representing the perspective in the 3D localization map 210 to the 2D depth data representing the 2D depth image 102. The generation of the approximation of depth information is performed based on the 2D depth data for the plurality of different perspectives in the 3D localization map 210.

The determination 602 of the benefit level of activating the monocular camera for localization may be based on determining a number of feature descriptors detected by processing of the 2D depth data through a feature descriptor detection algorithm. Given the 2D depth images 102, it is possible to understand how many and also how good 2D visual features would be acquired by the monocular camera 202, by for example feeding the 2D depth images 102 to a feature detector algorithm such as ORB, SIFT, etc. and obtaining the number of features M which are detected.

Accordingly, in one embodiment, the benefit level of activating the monocular camera 202 for localization can be further determined 602 based on the number of feature descriptors that satisfy a minimum feature number threshold. For example, the quality Qi of the detected features, may also be obtained. The benefit level could then be equal to M, or a function of the feature quality and quantity as for example the number of features Mi in M for which Qi(Mi)>Qmin, where Qmin is a minimum level of quality of a feature that is needed for the feature to be considered good. The quality of a feature can be inferred through conventional approaches.

For example, the following publication defines that the quality of each feature is the ti-temporal observability score of a feature across ti frames in Section 2.2, which essentially represents how consistently a feature is observed throughout consecutive image frames as the device is moving: Zhang, G., & Vela, P. A. (2015), "Good features to track for visual SLAM", 2015 IEEE Conference on Computer Vision and Pattern Recognition (CVPR), doi: 10.1109/cvpr.2015.7298743, 2015. The higher the score the higher the quality of the feature to be used for localization and mapping. Other quality metrics can be used. For example, a RANSAC algorithm can be applied on the features of several sequences of images, and the inliers and outliers sets can be computed for the sequence of images. Features which are consistently set in the inlier set are considered to have a higher quality than features which are included in the outlier set.

In some embodiments, the benefit level of activating the monocular camera 202 for localization can be determined 602 based on sampling and analyzing the 3D depth data 100 contained in the localization map 210 currently being used by the depth camera 200 to perform localization. In one embodiment, the determination 602 of the benefit level of activating the monocular camera for localization can include determining location of the monocular camera based on the depth data. A historical 3D localization map repository, which may correspond to the localization map repository 522 shown in FIG. 5, is accessed using the location of the monocular camera 202 to obtain historical depth data. The historical depth data, which represents a historical 3D localization map, is converted to historical 2D depth data representing a historical 2D depth image. An approximation of depth information that can be acquired from the monocular camera 202 if activated, is generated based on the historical 2D depth image. The benefit level is then determined based on the approximation of depth information.

Figure 4:
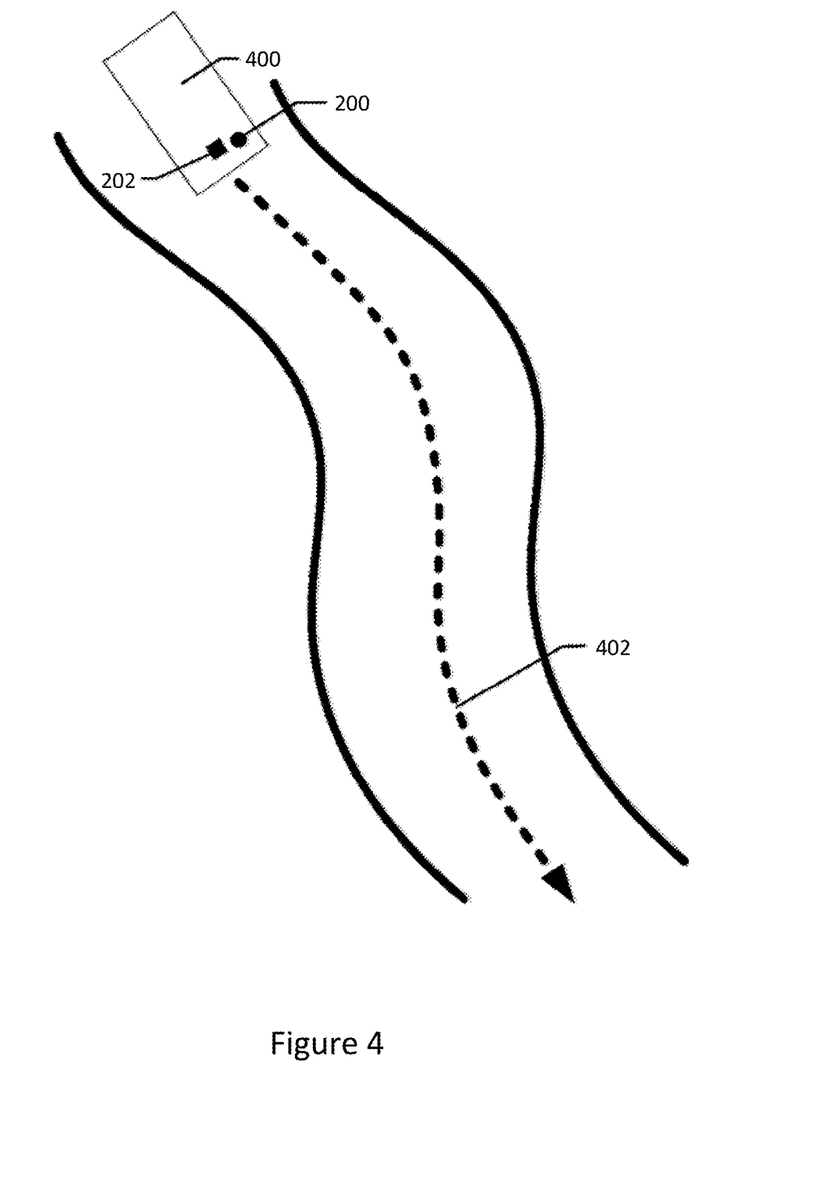
Figure 10:
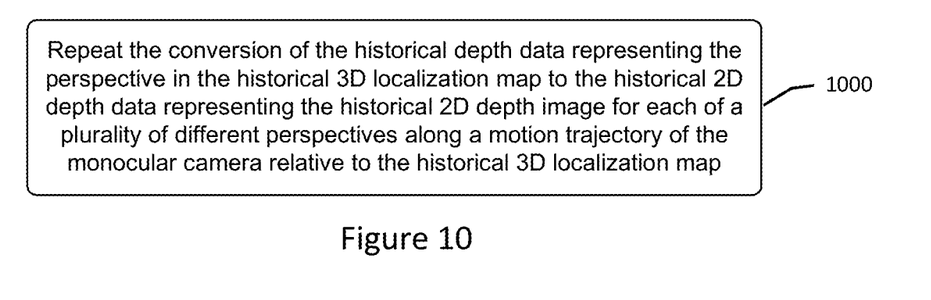

In a further embodiment, the benefit level of activating the monocular camera 202 is determined using a historical 3D localization map (e.g., within repository 522 in FIG. 5) and a present trajectory of the monocular camera 202 relative to locations in the historical 3D localization map. Example operations are described in the context of FIGS. 4 and 10. FIG. 4 illustrates a top-view of a device 400 with a depth sensor 200 and a monocular camera 202 moving through an environment along a predicted trajectory 402. In some embodiments, for each of a plurality of different perspectives along the predicted motion trajectory 402 of the monocular camera 202 relative to locations in the historical 3D localization map, the operations repeat 1000 the conversion of the historical depth data representing the perspective in the historical 3D localization map to the historical 2D depth data representing the historical 2D depth image 102. The generation of the approximation of depth information is performed based on the historical 2D depth data for the plurality of different perspectives along the predicted motion trajectory 402 of the monocular camera 202 relative to the historical 3D localization map.

For example, the device 500 determines its current pose with respect to the historical 3D localization map being used for localization, and knowledge of direction of motion of the device 500. Given this information, the operations obtain 2D depth images 102 for different perspectives within the historical 3D localization map corresponding to an estimate of the motion trajectory 402 and perform similar operations as detailed in the previous embodiment. For every chosen perspective, the operations can determine the benefit level of activating the monocular camera 202 for localization. Hence, instead of using only online data presently captured from the depth sensor 200, the operations can additionally rely on depth data captured apriori and stored in the historical 3D localization map.

Further operations are now described which can be performed to determine the benefit level of activating the monocular camera 202 for localization, and which can then determine therefrom whether the monocular camera 202 should be activated.

Figure 11:
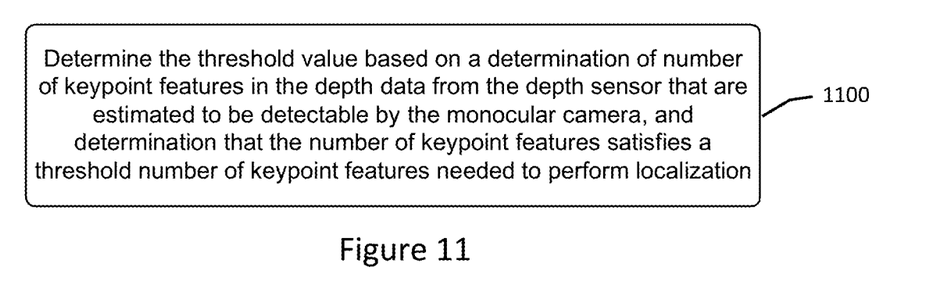

In some embodiments, the operations to activate 604 the monocular camera 202 based on whether the benefit level of activating the monocular camera 202 satisfies the activation rule, can include determining whether value of the benefit level satisfies a threshold value. The threshold value may be determined based on the operations shown in FIG. 11. Referring to FIG. 11, the operations determine 1100 the threshold value based on a determination of a number of feature descriptors in the depth data from the depth sensor 200 that are estimated to be detectable by the monocular camera 202, and a determination that the number of feature descriptors satisfies a threshold number of feature descriptors needed to perform localization. In a further embodiment, the number of feature descriptors in the depth data from the depth sensor that are estimated to be detectable by the monocular camera 202, is limited to include only the feature descriptors that satisfy a feature quality threshold.

In one particular example, the benefit level is equal to the number of detected feature descriptors M is above a desired threshold M>Mmin, where Mmin is defined as the lowest number of feature descriptors which have to be detected for the localization algorithm, e.g., the localization and mapping algorithm 212, to perform sufficiently well for its intended purpose. This can be obtained based on offline experiments using, e.g., a SLAM algorithm 212, such as proposed in Schneider, T., Dymczyk, M., Fehr, M., Egger, K., Lynen, S., Gilitschenski, I., and Siegwart, R., "Maplab: An open framework for research in visual-inertial mapping and localization", IEEE Robotics and Automation Letters, vol. 3, issue 3, pages 1418-1425, 2018, and then adapted online. Additionally, the operations may combine the number of feature descriptors with the quality of the feature descriptors, and define that the quality of feature descriptors Qi should be above a defined threshold as Qi>Qmin, for example 50%, where again Qmin may be defined based on offline experiments, and then adapted online.

For performing the computation of the device pose given an available map with 3D poses, the minimum number of required feature descriptors to be extracted from the images of the monocular camera 202 may depend on the localization algorithm that is used and the quality of the inferred feature descriptors. For example, the operations may be configured to require a minimum of 6 feature descriptors meeting a quality threshold. However, in order to handle noise when detecting and computing the pose of the features, a larger number of feature descriptors should be detected.

In some embodiments, the monocular camera 202 should be activated if a function of the benefit level obtained over a set of measurements, for example the average of the last N measurements with the depth sensor 200, is above an activation threshold.

Referring again to FIG. 4, in some embodiments, the monocular camera 202 should be activated when the benefit level determined over a set of measurements performed on the localization map (e.g. within the localization map repository 522 in FIG. 5), using a measurement for the current pose of the device 400 and the predicted pose of the device 400 along the future motion trajectory 402, is above the activation threshold.

The determination of whether the benefit level of activating the monocular camera 202 satisfies an activation rule can be based on the energy budget 206 of the device. For example, if the above conditions are satisfied for the benefit level of activating monocular camera 202, and there is furthermore a need to reduce the energy consumption of the device based on the energy budget 206, the lower power consuming monocular camera 202 can be activated and thereafter the high power consuming depth sensor 200 can be deactivated in order to reduce power consumption of the device.

In one particular example, the value of Mmin and Qmin are trained from experiments where both a monocular camera 202 and a depth sensor 200 are active and the number of feature descriptors M and their quality Qi are detected for both sensors. For example, for the monocular camera 202 to perform with the desired performance, Mmin and Qmin for the monocular camera 202 images should be at a desired value, and the corresponding values of M and Qi given the depth image are recorded. Then the model corresponding to the relationship between M and Qi for 3D depth data 100 and Mmin and Qmin for the monocular image is established, so when the benefit level computed given the 3D depth data 100 is above these values the monocular camera 202 should be activated.

Figure 7:
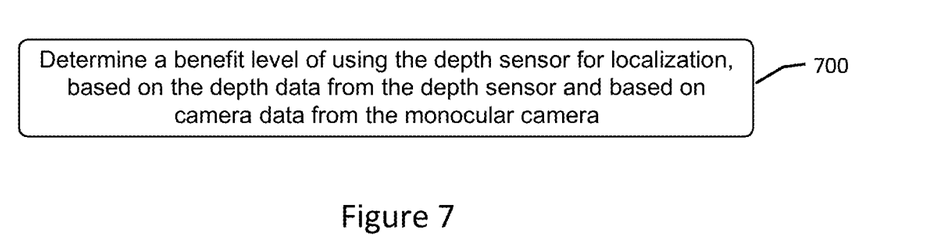

Some further embodiments are directed to determining the benefit level of continuing to use the depth sensor 200 for localization after the monocular camera 202 has become activated for localization, which may then trigger deactivation of the depth sensor. The benefit level of continuing to use the depth sensor 200 for localization can be determined based on the 3D depth data 100 from the depth sensor 200 and the image data received from the now-activated monocular camera 202. FIG. 7 illustrates a corresponding flowchart of operations for determining a benefit level of using the depth sensor 200 for localization. The operations determine 700 the benefit level of using the depth sensor 200 for localization, based on the depth data from the depth sensor 200 and based on image data from the monocular camera 202 after the activation 604 of the monocular camera 202 has been performed.

Figure 8:
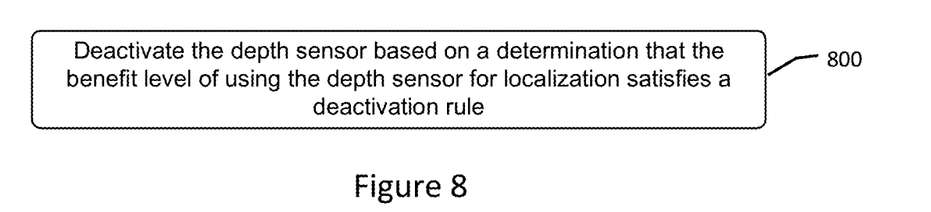

After the monocular camera 202 is activated, the device can determine if the depth sensor 200 should remain active or be deactivated. Referring to the embodiment of FIG. 8 the device operates to deactivate 800 the depth sensor based on a determination that the benefit level of using the depth sensor for localization satisfies a deactivation rule.

In one embodiment, the determination 700 that the benefit level of using the depth sensor 200 for localization satisfies the deactivation rule, includes determining a number of feature descriptors in the image data from the monocular camera 202, and determining that the number of feature descriptors in the image data within a common field of view of both the depth sensor 200 and the monocular camera 202 satisfies a threshold number of feature descriptors needed to perform localization. Because the field of view of the monocular camera 202 may be different than field of view of the depth camera 200, the feature descriptors may, for example, be determined in the 2D depth image space (from the 3D depth data from the depth sensor) which corresponds the field of view of the monocular camera 202.

In a further embodiment, the number of feature descriptors in the image data from the monocular camera 202 is limited to include only the feature descriptors that satisfy a feature quality threshold.

The decision to deactivate the depth sensor 200 or to instead let it remain activated may include analyzing the performance of the localization algorithm, e.g., the localization and mapping algorithm 212, given the monocular camera measurements. If the performance and/or robustness satisfies the deactivation role, the depth camera 200 is responsively turned off. The performance and/or robustness can be analyzed based on, for example, if the number of detected features M and the quality Qi of feature Mi in the image data from the monocular camera 202 are above a defined threshold. The threshold can be obtained and defined offline and then further adapted online. This can be combined with the properties of the pose obtained from the localization algorithm, e.g., the localization and mapping algorithm 212, as a determined error and variance in the output values of the localization algorithm, and if those values would be below a certain threshold, than it is interpreted that the algorithm performance and/or robustness is acceptable. Alternatively or additionally, the depth camera 200 may remain active and be used to achieve a superior algorithm performance.

The above embodiment can be combined using the energy budget 206 of the device 500 to determine whether the benefit level of activating the monocular camera satisfies an activation rule. Use of the energy budget 206 enables the device to react to a situation when there is excessively high power consumption because both the depth sensor 200 and the monocular camera 202 are simultaneously active, which can responsively trigger deactivation of the depth camera 200. In the corresponding embodiment, the determination 700 that the benefit level of using the depth sensor 200 for localization satisfies the deactivation rule includes determining that use of both the depth sensor 200 and the monocular camera 202 for localization consumes energy at a level greater than an energy budget 206 of how much energy should be provided by the device 500.

Deactivation of a sensor (e.g., the monocular camera 202 or the depth sensor 200) in various embodiments herein may be performed by triggering at least one of transitioning the sensor to a lower power state, powering-off the sensor, decreasing a data sampling rate of the sensor to a level below what is used for localization, decreasing resolution of the sensor to a level which is below what is used for localization, changing an optical parameter (e.g., focal length, field of view, etc.) to what is not used for localization, and adapting the localization algorithm to cease using parameters (e.g., optical parameters) of the sensor.

In another embodiment, the determination 700 that the benefit level of using the depth sensor 200 for localization satisfies the deactivation rule, is performed based on a determining whether hardware resource utilization that is obtained for device performing localization using the depth sensor 200, where the hardware resource utilization includes at least one of processor utilization, memory utilization, and network communication utilization.

As explained above, activation of a sensor (i.e., the depth sensor 200 or the monocular camera 202) may be performed by triggering at least one of transitioning the sensor to a higher power state, powering-on the sensor, increasing a data sampling rate of the sensor to a level which is used for localization, increasing resolution of the sensor to a level which is used for localization, changing an optical parameter (e.g., focal length, field of view, etc.) to what is used for localization, and adapting the localization algorithm to use parameters (e.g., optical parameters) of the sensor. Thus in one embodiment, the activation 604 of the monocular camera 202 includes one of triggering at least one of transitioning the monocular camera 202 to a higher power state, powering-on the monocular camera 202, increasing a data sampling rate of the monocular camera 202 to a level which is used for localization, increasing resolution of the monocular camera 202 to a level which is used for localization, and adapting a localization algorithm 212 to use optical parameters of the monocular camera 202.

Some other related embodiments are directed to a corresponding method by a device for performing localization using one or both of a depth sensor and a monocular camera that are transportable with the device. The method includes: receiving 600 depth data from the depth sensor, determining 602 a benefit level of activating the monocular camera for localization, based on the depth data, and activating 604 the monocular camera for localization based on a determination that the benefit level of activating the monocular camera satisfies an activation rule. In various further embodiments the method further performs any of the operations described above in the context of FIGS. 1-11.

Some other related embodiments are directed to computer program product for performing localization using one or both of a depth sensor and a monocular camera that are transportable with a device. The computer program product includes a non-transitory computer readable medium 520 storing instructions executable at least one processor of the device to configure the device to: receive depth data from the depth sensor, determine a benefit level of activating the monocular camera for localization, based on the depth data, and activate the monocular camera for localization based on a determination that the benefit level of activating the monocular camera satisfies an activation rule. In various further embodiments the instructions further configure the device to further perform any of the operations described above in the context of FIGS. 1-11.

Further definitions and embodiments are explained below.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A device configured for performing localization using one or both of a depth sensor and a monocular camera that are transportable with the device, the device comprising:
   at least one processor operationally connected to the depth sensor and the monocular camera;
   at least one memory storing program code that is executed by the at least one processor to perform operations to:
     receive depth data from the depth sensor;
     determine a benefit level of activating the monocular camera for localization, based on the depth data; and
     activate the monocular camera for localization based on a determination that the benefit level of activating the monocular camera satisfies an activation rule,
     wherein the operations further configure the at least one processor to determine a benefit level of using the depth sensor for localization, based on the depth data from the depth sensor and based on image data from the monocular camera after the activation of the monocular camera has been performed,
     wherein the operations further configure the at least one processor to deactivate the depth sensor based on a determination that the benefit level of using the depth sensor for localization satisfies a deactivation rule, and
     wherein the determination that the benefit level of using the depth sensor for localization satisfies the deactivation rule comprises:
       determining a number of features in the image data from the monocular camera, and
       determining that the number of features in the image data within a common field of view of both the depth sensor and the monocular camera satisfies a threshold number of features needed to perform localization.

2. The device of claim 1, wherein the number of features in the image data from the monocular camera is limited to include only the features that satisfy a feature quality threshold.

3. The device of claim 1, wherein the determination that the benefit level of using the depth sensor for localization satisfies the deactivation rule comprises determining that use of both the depth sensor and the monocular camera for localization consumes energy at a level greater than an energy budget of how much energy should be provided by the device.

4. The device of claim 1, wherein the determination that the benefit level of using the depth sensor for localization satisfies the deactivation rule, is performed based on a hardware resource utilization that is obtained for device performing localization using the depth sensor, wherein the hardware resource utilization comprises at least one of processor utilization, memory utilization, and network communication utilization.

5. The device of claim 1, wherein the activation of the monocular camera comprises one of triggering at least one of transitioning the monocular camera to a higher power state, powering-on the monocular camera, increasing a data sampling rate of the monocular camera to a level which is used for localization, increasing resolution of the monocular camera to a level which is used for localization, changing an optical parameter to what is used for localization, and adapting a localization algorithm to use optical parameters of the monocular camera.

6. The device of claim 1, wherein the benefit level of activating the monocular camera for localization is determined based on:
   converting the depth data, which represents a 3-dimensional, 3D, localization map, to 2-dimensional, 2D, depth data representing a 2D depth image;
   generating an approximation of depth information that can be acquired from the monocular camera if activated, based on the 2D depth image; and
   determining the benefit level of activating the monocular camera for localization based on the approximation of depth information.

7. The device of claim 6, further comprising:
   for each of a plurality of different perspectives in the 3D localization map, repeating the conversion of the depth data representing the perspective in the 3D localization map to the 2D depth data representing the 2D depth image,
   wherein the generation of the approximation of depth information is performed based on the 2D depth data for the plurality of different perspectives in the 3D localization map.

8. The device of claim 6, wherein the determination of the benefit level of activating the monocular camera for localization is based on determining a number of features detected by processing of the 2D depth data through a feature detection algorithm.

9. The device of claim 8, wherein the determination of the benefit level of activating the monocular camera for localization is further based on the number of features that satisfy a minimum feature number threshold.

10. The device of claim 1, wherein the determination of the benefit level of activating the monocular camera for localization is based on:
    determining location of the monocular camera based on the depth data;
    accessing a historical 3D localization map repository using the location of the monocular camera to obtain historical depth data;
    converting the historical depth data, which represents a historical 3D localization map, to historical 2D depth data representing a historical 2D depth image;
    generating an approximation of depth information that can be acquired from the monocular camera if activated, based on the historical 2D depth image; and
    determining the benefit level of activating the monocular camera for localization based on the approximation of depth information.

11. The device of claim 10, further comprising:
    for each of a plurality of different perspectives along a motion trajectory of the monocular camera relative to the historical 3D localization map, repeating the conversion of the historical depth data representing the perspective in the historical 3D localization map to the historical 2D depth data representing the historical 2D depth image,
    wherein the generation of the approximation of depth information is performed based on the historical 2D depth data for the plurality of different perspectives along the motion trajectory of the monocular camera relative to the historical 3D localization map.

12. The device of claim 1, wherein activating the monocular camera for localization based on the determination that the benefit level of activating the monocular camera satisfies the activation rule comprises determining that a value of the benefit level satisfies a threshold value.

13. The device of claim 12, further comprising:
    determining the threshold value based on a determination of a number of features in the depth data from the depth sensor that are estimated to be detectable by the monocular camera, and a determination that the number of features satisfies a threshold number of features needed to perform localization.

14. The device of claim 13, wherein the number of features in the depth data from the depth sensor that are estimated to be detectable by the monocular camera, is limited to include only the features that satisfy a feature quality threshold.

15. A device configured for performing localization using one or both of a depth sensor and a monocular camera that are transportable with the device, the device comprising:
at least one processor operationally connected to the depth sensor and the monocular camera;
at least one memory storing program code that is executed by the at least one processor to perform operations to:
receive depth data from the depth sensor;
determine a benefit level of activating the monocular camera for localization based on the depth data; and
activate the monocular camera for localization based on a determination that the benefit level of activating the monocular camera satisfies an activation rule,
wherein the operations further configure the at least one processor to determine a benefit level of using the depth sensor for localization, based on the depth data from the depth sensor and based on image data from the monocular camera after the activation of the monocular camera has been performed,
wherein the operations further configure the at least one processor to deactivate the depth sensor based on a determination that the benefit level of using the depth sensor for localization satisfies a deactivation rule, and
wherein the determination that the benefit level of using the depth sensor for localization satisfies the deactivation rule comprises determining that use of both the depth sensor and the monocular camera for localization consumes energy at a level greater than an energy budget of how much energy should be provided by the device.

16. A device configured for performing localization using one or both of a depth sensor and a monocular camera that are transportable with the device, the device comprising:
at least one processor operationally connected to the depth sensor and the monocular camera;
at least one memory storing program code that is executed by the at least one processor to perform operations to:
receive depth data from the depth sensor;
determine a benefit level of activating the monocular camera for localization based on the depth data; and
activate the monocular camera for localization based on a determination that the benefit level of activating the monocular camera satisfies an activation rule,
wherein the operations further configure the at least one processor to determine a benefit level of using the depth sensor for localization, based on the depth data from the depth sensor and based on image data from the monocular camera after the activation of the monocular camera has been performed,
wherein the operations further configure the at least one processor to deactivate the depth sensor based on a determination that the benefit level of using the depth sensor for localization satisfies a deactivation rule, and
wherein the determination that the benefit level of using the depth sensor for localization satisfies the deactivation rule, is performed based on a hardware resource utilization that is obtained for device performing localization using the depth sensor, wherein the hardware resource utilization comprises at least one of processor utilization, memory utilization, and network communication utilization.

17. A device configured for performing localization using one or both of a depth sensor and a monocular camera that are transportable with the device, the device comprising:
at least one processor operationally connected to the depth sensor and the monocular camera;
at least one memory storing program code that is executed by the at least one processor to perform operations to:
receive depth data from the depth sensor;
determine a benefit level of activating the monocular camera for localization based on the depth data; and
activate the monocular camera for localization based on a determination that the benefit level of activating the monocular camera satisfies an activation rule,
wherein the benefit level of activating the monocular camera for localization is determined based on:
converting the depth data, which represents a 3-dimensional, 3D, localization map, to 2-dimensional, 2D, depth data representing a 2D depth image;
generating an approximation of depth information that can be acquired from the monocular camera if activated, based on the 2D depth image; and
determining the benefit level of activating the monocular camera for localization based on the approximation of depth information.

18. A device configured for performing localization using one or both of a depth sensor and a monocular camera that are transportable with the device, the device comprising:
at least one processor operationally connected to the depth sensor and the monocular camera;
at least one memory storing program code that is executed by the at least one processor to perform operations to:
receive depth data from the depth sensor;
determine a benefit level of activating the monocular camera for localization based on the depth data; and
activate the monocular camera for localization based on a determination that the benefit level of activating the monocular camera satisfies an activation rule,
wherein the determination of the benefit level of activating the monocular camera for localization is based on:
determining location of the monocular camera based on the depth data;
accessing a historical 3D localization map repository using the location of the monocular camera to obtain historical depth data;
converting the historical depth data, which represents a historical 3D localization map, to historical 2D depth data representing a historical 2D depth image;
generating an approximation of depth information that can be acquired from the monocular camera if activated, based on the historical 2D depth image; and
determining the benefit level of activating the monocular camera for localization based on the approximation of depth information.

19. A device configured for performing localization using one or both of a depth sensor and a monocular camera that are transportable with the device, the device comprising:
at least one processor operationally connected to the depth sensor and the monocular camera;

at least one memory storing program code that is executed by the at least one processor to perform operations to:
receive depth data from the depth sensor;
determine a benefit level of activating the monocular camera for localization based on the depth data;
activate the monocular camera for localization based on a determination that the benefit level of activating the monocular camera satisfies an activation rule,
wherein activating the monocular camera for localization based on the determination that the benefit level of activating the monocular camera satisfies the activation rule comprises determining that a value of the benefit level satisfies a threshold value; and
determine the threshold value based on a determination of a number of features in the depth data from the depth sensor that are estimated to be detectable by the monocular camera, and a determination that the number of features satisfies a threshold number of features needed to perform localization.

* * * * *